(12) United States Patent
Sussmann et al.

(10) Patent No.: US 6,707,045 B1
(45) Date of Patent: Mar. 16, 2004

(54) DETECTOR FOR IONISING RADIATION

(76) Inventors: Ricardo Simon Sussmann, 5 Arborfield Court, Swallowfield Road, Arborfield Cross, Reading, Berkshire RG2 9JS (GB); Geoffrey Alan Scarsbrook, 40 Cavendish Mead, Sunninghall, Ascot, Berkshire SL5 9TD (GB); Andrew David Garry Stewart, The Old Rectory, Ashampstead, Reading, Berkshire RG8 8SH (GB)

( * ) Notice: Subject to any disclaimer, the term of this patent is extended or adjusted under 35 U.S.C. 154(b) by 0 days.

(21) Appl. No.: 09/719,242
(22) PCT Filed: Jun. 3, 1999
(86) PCT No.: PCT/IB99/01002
§ 371 (c)(1),
(2), (4) Date: Jul. 5, 2001
(87) PCT Pub. No.: WO99/64892
PCT Pub. Date: Dec. 16, 1999

(30) Foreign Application Priority Data

Jun. 8, 1998 (GB) ............................................. 9812341

(51) Int. Cl.$^7$ ................................................. G01T 1/24
(52) U.S. Cl. ............................ 250/370.01; 250/370.02; 250/370.06
(58) Field of Search ....................... 250/370.06, 370.01, 250/370.02

(56) References Cited

U.S. PATENT DOCUMENTS

| | | | |
|---|---|---|---|
| 3,450,879 A | | 6/1969 | Seppi |
| 3,527,944 A | * | 9/1970 | Kraner .................. 250/370.01 |
| 5,457,322 A | * | 10/1995 | Kitaguchi et al. ..... 250/370.06 |
| 5,773,830 A | * | 6/1998 | Lu et al. ................ 250/370.01 |

FOREIGN PATENT DOCUMENTS

| | | |
|---|---|---|
| EP | 0 381 517 A3 | 8/1990 |
| WO | 97/00456 | 1/1997 |
| WO | 99/64892 | 12/1999 |

* cited by examiner

*Primary Examiner*—Constantine Hannaher
(74) *Attorney, Agent, or Firm*—Scully, Scott, Murphy & Presser

(57) ABSTRACT

A detector for ionising radiation comprises first (10) and second (12) diamond detector elements which are connected to a common contact (14). The two detector elements are of differing thickness and are optimised for the detection of different types of radiation, so that the detector simultaneously provides two output signals indicative of different kinds of radiation incident on the detector.

14 Claims, 1 Drawing Sheet

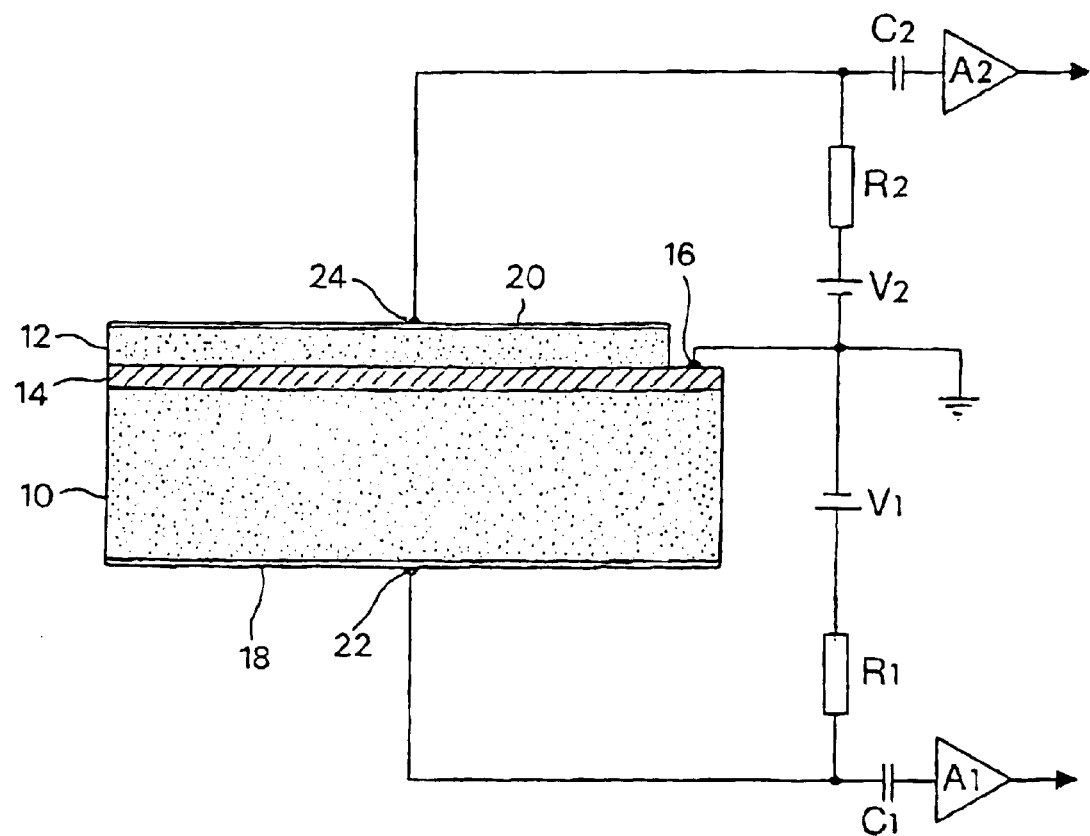

DETECTOR FOR IONISING RADIATION

BACKGROUND OF THE INVENTION

This invention relates to a detector for ionising radiation.

Radiation detectors comprising diamond have been proposed which are optimised for the detection of different types of radiation. For example, radiation comprising heavy particles such as alpha particles is usually absorbed close to the surface of a detector element, so that a radiation detector optimised for the detection of such radiation can be relatively thin. On the other hand, radiation such as beta particles, x-rays or gamma-rays tends to penetrate the material of a detector element to a greater depth and to be absorbed substantially uniformly throughout the bulk of the detector element.

It is an object of the invention to provide a single detector which is able to detect such different types of radiation optimally, or which can provide different types of information about a single type of radiation.

SUMMARY OF THE INVENTION

According to the invention there is provided a detector for ionising radiation comprising at least first and second diamond detector elements connected electrically to a common contact, with respective first and second contacts connected to the first and second detector elements, so that the detector simultaneously provides first and second output signals corresponding to radiation incident on the detector elements.

Preferably the first and second detector elements are optimised for the detection of different types of radiation, or for the detection of different parameters of a particular type of radiation.

The first and second detector elements may be formed as respective first and second layers of diamond material in contact with a common metallic or semi-conductor layer.

In a preferred embodiment of the invention, the first layer comprises a relatively thick layer of diamond material and the second layer comprises a relatively thin layer of diamond material.

The common metallic or semi-conductor layer may comprise a material selected from the group consisting of titanium, tungsten, molybdenum and boron doped diamond.

The first layer may have a thickness of between 0.3 mm and 1.5 mm and a collection distance of at least 20 $\mu$m, preferably at least 50 $\mu$m, and even more preferably a distance of 300 $\mu$m or more. The first layer may be optimised for the detection of beta particles, x-rays and gamma rays.

The second layer may have a thickness of between 10 $\mu$m and 40 $\mu$m and may be optimised for the detection of alpha particles.

The detector may further include respective conductive layers on the outer surfaces of the first and second layers of diamond material, which preferably comprise a material selected from the group consisting of titanium, tungsten, molybdenum and boron doped diamond.

Respective active contacts may be connected to the conductive layers.

The invention also extends to a radiation detector apparatus comprising a detector as defined above, and farther comprising bias means arranged to apply respective bias voltages to the first and second diamond detector elements, and first and second amplifiers having inputs connected to the first and second diamond detector elements and arranged to generate respective first and second amplified output signals corresponding to radiation incident on the detector elements.

DESCRIPTION OF THE DRAWING

The drawing is a highly schematic sectional view of a radiation detector according to the invention, with associated electronic circuitry.

DESCRIPTION OF AN EMBODIMENT

The illustrated radiation detector comprises a first, relatively thick diamond layer 10 and a second, relatively thin diamond layer 12 on either side of a layer 14 of metal or semi-conductive material which serves as a common contact or electrode. The layers 10 and 12 are optimised for the detection of different kinds of ionising radiation, so that a single, unitary radiation detector element is provided which can effectively detect different types of radiation. Alternatively, for example, the detector of the invention could be used for the simultaneous or sequential measurement of partial energy loss of a particle (measured in the thin layer 12) and total particle energy (measured in the thick layer 10).

A prototype radiation detector of the invention was manufactured by commencing with the layer 10, which was a layer of high quality diamond produced by chemical vapour deposition (CVD) with a thickness between 0.3 mm and 1.5 mm and a collection distance of 20 $\mu$m, but typically at least 50 $\mu$m and depending on the application, possibly up to 300 $\mu$m or more.

Collection distance and its determination are known in the art. Radiation such as UV, x-rays and gamma rays impinging on diamond can form electron/hole pairs which drift under an applied voltage between electrodes. Typically, for penetrating radiation such as beta and gamma rays, the electrodes are placed on opposite surfaces of a diamond layer whose thickness is typically 200–700 $\mu$m, but can range from less than 100 $\mu$m to greater than 1000 $\mu$m, and the charge carriers (electrons/holes) drift through the thickness of the layer. For highly absorbed radiation which penetrates only a few $\mu$m into the diamond, such as alpha radiation or UV radiation with energies near or above that of the band gap, then inter-digitated electrode arrangements on the same face of the diamond layer may be used; this face may be planar or with the electrodes placed in relationship to surface structures such as grooves.

However, the electrons and holes have finite mobilities and lifetimes so they move only a certain distance before recombining. When an event occurs (e.g. impingement of beta particles) which forms charge carriers, then to first order the total signal from the detector depends on the average distance moved by the charge carriers. This charge displacement is a product of the carrier mobility and the applied electric field (which gives the charge drift velocity) and the recombination lifetime of the carriers before trapping or recombination stops its drift. This is the collection distance which can also be considered as the volume of charge swept to the electrode. The purer the diamond (or the lower the level of uncompensated traps) or the lower the level of crystalline imperfections, the higher the mobility of the carriers and/or their lifetimes.

The next step is the application of the conductive layer 14 to the layer 10. The conductive layer can comprise a metal which adheres to CVD diamond, such as titanium (Ti), tungsten (W), molybdenum (Mo) or other suitable metals. Alternatively, the layer 14 can comprise a substantially conductive semi-conductor layer such as boron doped diamond.

The layer 12 is grown by a CVD process on top of the layer 14 to a thickness optimised for the detection of a different form of radiation compared with that for which the layer 10 is optimised. (In the prototype, the layer 10 was optimised for the detection of beta particles, x-rays and gamma-rays, while the layer 12 was optimised for the detection of alpha particles). In the prototype, the layer 12 had a thickness between 10 $\mu$m and 40 $\mu$m.

An alternative method of forming the radiation detector is to grow the layers 10 and 12 separately, and then to adhere the conductive layer 14 to one of these layers. The free surface of the conductive layer 14 can then be bonded to the other of the layers 10 or 12.

At one edge of the detector element, a small portion of the layer 12 was removed by a known technique such as oxygen plasma etching, ion beam milling/etching or laser ablation to expose a section 16 of the common contact/electrode 14. (Alternatively, at the time the layer 12 is grown, a section of the layer 14 may be masked. This would prevent the layer 12 from growing on the masked section, rather than having to remove a portion of it after growth.) The section 16 serves as a common ground contact for the respective layers of the detector elements. In addition, conductive layers 18 and 20 were applied to the outer surfaces of the layers 10 and 12, respectively, to permit the connection of respective active contacts 22 and 24. The conductive layers 18 and 20 can comprise the same metal as that used for the layer 14, ie. Ti, W, Mo or other suitable metals.

The respective contacts are used to bias the respective active layers of the device and to connect the detector elements to suitable electronics.

As shown in the FIGURE, the contact 22 is connected to an input of a charge sensitive or operational preamplifier $A_1$ via a coupling capacitor $C_1$ while the contact 24 is connected to the input of a similar amplifier $A_1$ via a coupling capacitor $C_2$. Respective bias voltages $V_1$ and $V_2$ are applied to the contacts 22 and 24 via resistors $R_1$ and $R_2$. Typically, the bias voltages are 0.1 to 3V/$\mu$m. The sign of the applied bias voltage (positive or negative) may vary from what is indicated in the FIGURE, depending on the application and the material selected for the common contact/electrode.

In a variation of the invention, the metal conductive layer 14 can be replaced by a CVD diamond boron doped layer. This has the advantage that the layer 14, and subsequently the layer 12, can both be grown epitaxially on the layer 10, resulting in the layer 12 being of a higher quality. This is because the quality (for charge collection efficiency) is known to increase with the thickness of the layer. In the case of the above described example, the layer 12 will typically be polycrystalline in nature and will have a large component of the nucleation grain structure, which is known to be of relatively poor quality, whereas in the second example, the layer 12 will start to grow replicating the grain structure of the layer 14, which in turn should replicate that of the layer 10.

There will be a small amount of interaction between the two layers, for example, the generation of a small signal in the layer 12 due to the absorption of beta particles, but this will be in the ratio of the respective thicknesses of the layers 10 and 12, which can be made to be over a factor of 10.

In other applications, it is required to make two simultaneous measurements of the same particle(s) using a transmission detector which measures the partial energy loss in a thin transmission detector ($\Delta$E), and total particle energy in an absorbing detector (E). From accurate measurement of both E and $\Delta$E it is possible to calculate the mass of the particle and thus differentiate between light charged particles which have a similar mass, eg. protons, deuterons, and 'He ions. In this type of application, the requirement on the transmission detector is that it should be sufficiently thin to allow transmission of the particles of interest, which in certain applications can limit the thickness in a diamond detector to 40 $\mu$m or less, making the detector potentially fragile. The dual detector arrangement provides both the measurement of both $\Delta$E and E in one device, and mechanical support for the otherwise fragile $\Delta$E detector. The latter makes it more robust and suitable for larger areas and also give the possibility of reducing further its thickness so that the lower energy cutoff is reduced and the energy straggling is improved. In this type of application it is important to select an interlayer of the correct thickness and properties in order to minimise the error introduced to the measure of $E_1$ but it does avoid the need for two separate contact layers on separate $\Delta$E and E detectors, so that overall the system design is simplified.

The concept of the invention could easily be extended to a device having more than two detector layers. For example, such a device might be used for the detection of more than two different types of radiation of different penetration or energy loss characteristics.

What is claimed is:

1. A detector for ionising radiation comprising a first relatively thick layer of diamond material and a second relatively thin layer of diamond material adjacent to the first layer, the layers being connected electrically to a common contact, the first and second layers being designed for the detection of different types of radiation or for the detection of different parameters of a particular type of radiation, with respective first and second contacts connected to the first and second layers, so that the detector simultaneously provides first and second output signals corresponding to radiation incident on the first and second layers of diamond material.

2. A detector according to claim 1 wherein the common contact comprises a metallic or semi-conductor layer between the first and second diamond layers.

3. A detector according to claim 2 wherein the common metallic or semi-conductor layer comprises a material selected from the group consisting of titanium, tungsten, molybdenum and boron doped diamond.

4. A detector according to claim 1 wherein the first layer has a thickness of between 0.3 mm and 1.5 mm.

5. A detector according to claim 4 wherein the first layer has a collection distance of at least 20 $\mu$m.

6. A detector according to claim 5 wherein the first layer has a collection distance of at least 50 $\mu$m.

7. A detector according to claim 6 wherein the first layer has a collection distance of 300 $\mu$m or more.

8. A detector according to claim 1 wherein the first layer is designed for the detection of beta particles, x-rays and gamma rays.

9. A detector according to claim 1 wherein the second layer has a thickness of between 10 $\mu$m and 40 $\mu$m.

10. A detector according to claim 1 wherein the second layer is designed for the detection of alpha particles.

11. A detector according to claim 1 further including respective conductive layers on the outer surfaces of the first and second layers of diamond material.

12. A detector according to claim 11 wherein the conductive layers comprise a material selected from the group consisting of titanium, tungsten, molybdenum and boron doped diamond.

13. A detector according to claim 11 including respective active contacts connected to the conductive layers.

14. Radiation detector apparatus comprising a detector according to claim 1, bias means arranged to apply respective bias voltages to the first and second diamond layers, and first and second amplifiers having inputs connected to the first and second diamond layers and arranged to generate respective first and second amplified output signals corresponding to radiation incident on the layers.

* * * * *